(12) United States Patent
Nakata

(10) Patent No.: US 8,973,887 B2
(45) Date of Patent: Mar. 10, 2015

(54) SLIDE STRUCTURE, SUPPORT STRUCTURE AND SEISMICALLY ISOLATED STRUCTURE

(75) Inventor: Yasuhiro Nakata, Tokyo (JP)

(73) Assignee: Nippon Steel & Sumikin Engineering Co., Ltd., Tokyo (JP)

( * ) Notice: Subject to any disclaimer, the term of this patent is extended or adjusted under 35 U.S.C. 154(b) by 0 days.

(21) Appl. No.: 13/138,930

(22) PCT Filed: Apr. 22, 2010

(86) PCT No.: PCT/JP2010/002919
§ 371 (c)(1),
(2), (4) Date: Oct. 25, 2011

(87) PCT Pub. No.: WO2010/125775
PCT Pub. Date: Nov. 4, 2010

(65) Prior Publication Data
US 2012/0037786 A1    Feb. 16, 2012

(30) Foreign Application Priority Data

Apr. 27, 2009  (JP) .................................. 2009-107618

(51) Int. Cl.
*F16M 13/00*    (2006.01)
*E04B 1/98*     (2006.01)
(Continued)

(52) U.S. Cl.
CPC ............. *F16C 33/201* (2013.01); *F16C 23/045* (2013.01); *F16C 29/02* (2013.01); *F16C 33/103* (2013.01)
USPC .......... 248/636; 248/562; 52/167.5; 52/167.1; 52/167.2; 52/167.3; 52/167.4; 52/167.6; 52/167.7; 52/167.8; 52/167.9; 267/141; 267/141.1

(58) Field of Classification Search
USPC ....................... 248/636, 562; 267/141, 141.1; 52/167 E, 167.1–167.9
See application file for complete search history.

(56) References Cited

U.S. PATENT DOCUMENTS 4,121,393 A * 10/1978 Renault et al. ................ 52/167.7
4,320,549 A *  3/1982 Greb ............................... 14/73.5
(Continued)

FOREIGN PATENT DOCUMENTS

| CN | 1232849   | 10/1999 |
|----|-----------|---------|
| CN | 1135259   | 1/2004  |
| JP | 01-146042 | 6/1989  |
| JP | 1-122102  | 8/1989  |

(Continued)

OTHER PUBLICATIONS

International Search Report dated Aug. 3, 2010 issued in corresponding PCT Application No. PCT/JP2010/002919.
(Continued)

*Primary Examiner* — Christopher Garft
(74) *Attorney, Agent, or Firm* — Kenyon & Kenyon LLP

(57) ABSTRACT

In a slide structure, a support structure and a seismically isolated structure, a first sliding surface (25) of a sliding member (21) is formed of a sliding body (24) made of synthetic resin. A film (27) made of synthetic resin and having a Young's modulus more than twice as large as that of the first sliding surface (25) is formed on the second sliding surface (28) of the counter member (22). At the same time, fine irregularities having a maximum height Rz of 3 μm or higher are formed on the surface of the film (27). As a result, the lubricant is trapped in small pits of the irregularities to prevent the lubricant from flowing out, and a stable low friction state can be maintained.

13 Claims, 5 Drawing Sheets

(51) Int. Cl.
*F16C 33/20* (2006.01)
*F16C 23/04* (2006.01)
*F16C 29/02* (2006.01)
*F16C 33/10* (2006.01)

(56) References Cited

U.S. PATENT DOCUMENTS

| | | | | |
|---|---|---|---|---|
| 4,731,966 | A | * | 3/1988 | Fujita et al. .................. 52/167.1 |
| 5,410,845 | A | * | 5/1995 | Sakamoto et al. ............ 52/167.2 |
| 5,487,534 | A | * | 1/1996 | Sakamoto et al. .......... 267/141.1 |
| 6,467,961 | B2 | * | 10/2002 | Nakamaru et al. ............... 384/13 |
| 6,554,542 | B2 | * | 4/2003 | Mano et al. .................... 405/251 |
| 7,530,555 | B2 | * | 5/2009 | Chuang ......................... 267/136 |
| 2006/0174555 | A1 | * | 8/2006 | Zayas et al. ................... 52/167.4 |
| 2008/0222975 | A1 | * | 9/2008 | Nakata et al. ................. 52/167.9 |
| 2009/0286076 | A1 | * | 11/2009 | Xu et al. ........................ 428/339 |

FOREIGN PATENT DOCUMENTS

| | | |
|---|---|---|
| JP | 6-40243 | 10/1994 |
| JP | 8-42561 | 2/1996 |
| JP | 2629011 | 7/1997 |
| JP | 11-124591 | 5/1999 |
| JP | 2000-170828 | 6/2000 |
| JP | 2000-320611 | 11/2000 |
| JP | 2001-082543 | 3/2001 |
| JP | 2001-132757 | 5/2001 |
| JP | 2004-092817 | 3/2004 |
| JP | 3563669 | 9/2004 |
| JP | 4123585 | 7/2008 |

OTHER PUBLICATIONS

Chinese Office Action dated Feb. 21, 2013, issued in corresponding Chinese Application No. CN 201080018002.3, with an English translation of the Search Report only.

* cited by examiner

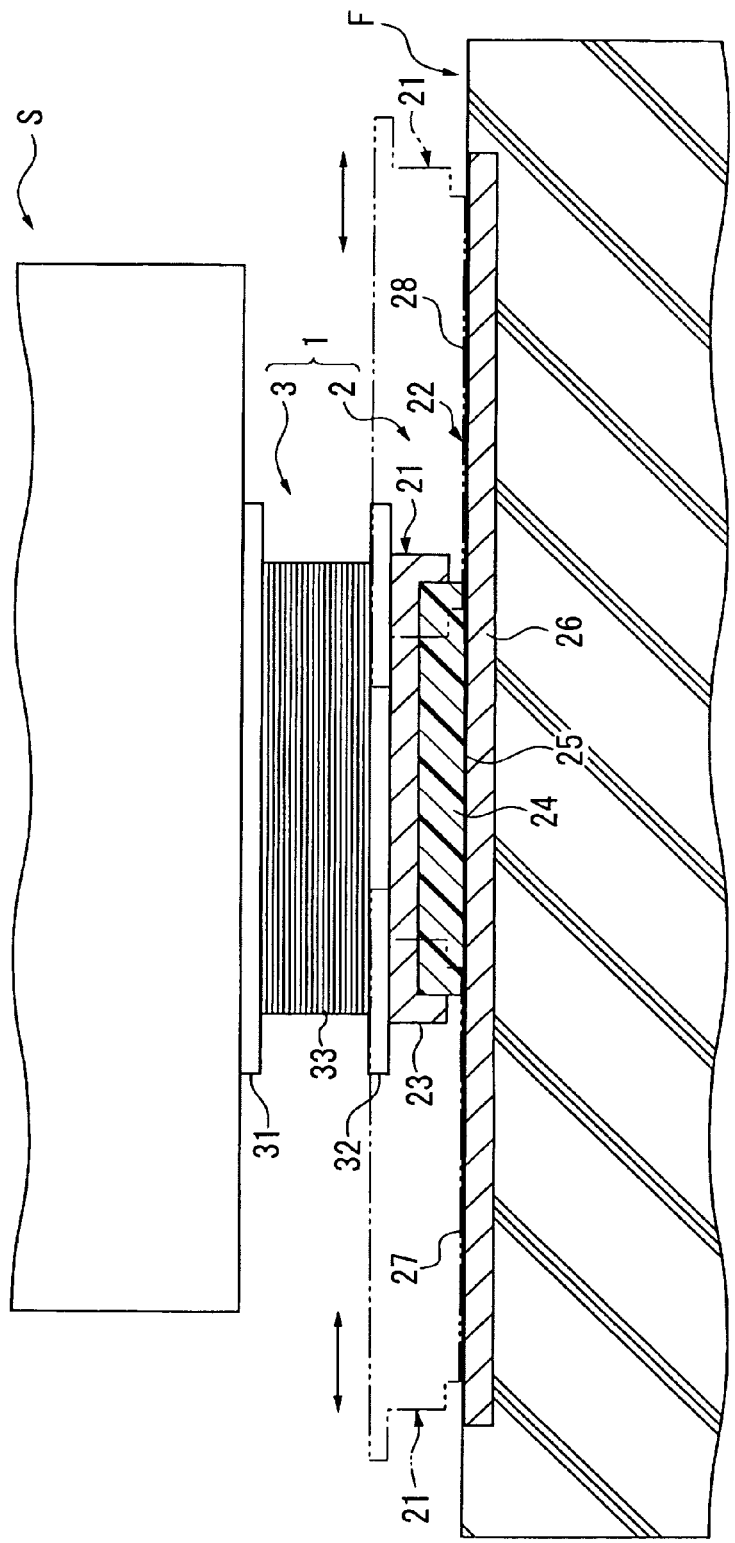

SLIDE STRUCTURE, SUPPORT STRUCTURE AND SEISMICALLY ISOLATED STRUCTURE

TECHNICAL FIELD

The present invention relates to a slide structure, a support device, and a seismically isolated structure.

This application is a national stage application of International Application No. PCT/JP2010/002919, filed Apr. 22, 2010, which claims priority to Japanese Patent Application No. 2009-107618, filed Apr. 27, 2009, the content of which is incorporated herein by reference.

BACKGROUND ART

Conventionally, a sliding support device including a slide member (first member) and a counter member (second member) has been known as a sliding support device used for seismically isolated structures. This sliding support device is constructed such that the slide member can slide along the surface of the counter member having a sufficiently large area, and a load can be transmitted from one of the slide member and the counter member to the other. In such a sliding support device, it is important to decrease the friction coefficient on sliding surfaces of the slide member and the counter member as much as possible in view of seismic isolation performance. In order to obtain a friction coefficient equal to or lower than 0.1, it is common to apply a fluid lubricant in the form of gel or liquid such as grease or oil to the sliding surface. However, these fluid lubricants are gradually discharged from the sliding surface in association with sliding, at the time of alternate sliding when the slide member and the counter member repeatedly slide, thereby increasing the friction coefficient on the sliding surface. In order to prevent the lubricant from flowing out and maintain a favorable low friction coefficient state with less maintenance frequency, various support devices as described below have been proposed.

In Patent Documents 1 and 2, there are proposed support devices in which a slide member is made of self-lubricating resin and concave machining is applied to the surface thereof to fill a lubricant therein, and a counter member is made of a leveling material, the surface of which is formed smoothly, so that lubricating ability on the sliding surfaces thereof is maintained.

In the support device described in Patent Document 1, a concave portion is provided in a solid slide member having a low friction coefficient, a gel lubricant is sealed in the concave portion, and the gel lubricant is also applied to around the concave portion. On the other hand, the counter member is made from a stainless steel plate, or a surface of a resin plate applied with tetrafluoroethylene is formed as a smooth surface.

In the support device described in Patent Document 2, a concave portion is formed which communicates with a surface of a slide member made from tetrafluoroethylene resin and does not have an open end at an outer edge thereof, and a lubricant made of fluorine grease is applied thereto. On the other hand, the counter member is made using a smooth plate having a smooth surface. Surface roughness of the smooth plate is set such that a maximum height Rz defined by JIS B0601-2001 (ISO 4287) is from 0.05 to 0.50 μm (preferably, from 0.10 to 0.20 μm).

In the support device described in Patent Document 3, a slide member is made of synthetic resin having a relatively high strength, and concave machining is applied to the surface thereof to fill a lubricant therein. On the other hand, the counter member is formed of a plate with a thin synthetic resin surface having a surface elastic modulus (Young's modulus) equal to or lower than that of the slide member. Thus, in Patent Document 3, a support device is proposed in which the strength of the counter member is ensured.

In the support device described in Patent Document 3, the slide member is made of synthetic resin (polyacetal, polyamide, polyphenylene ether, phenol, glass fiber-containing polycarbonate, and the like) having a compressive strength of from 50 to 120 MPa, and the counter member includes a self-lubricating synthetic resin film made of polyamideimide resin or epoxy resin containing tetrafluoroethylene. The synthetic resin film of the counter member has a film thickness of 100 μm or less (preferably, from 20 to 40 μm), so that a friction coefficient ($\mu$) as low as 0.02 to 0.04 can be obtained on sliding surfaces of the slide member and the counter member.

In Patent Document 4, there is proposed a support device in which a slide member is made of tetrafluoroethylene resin (self-lubricating resin) having holes produced using a special method and impregnated with a fluid lubricant, and the surface of a counter member is coated with resin formed by the same method. Thus, in Patent Document 4, a support device is proposed that prevents a lubricant from flowing out to thereby maintain the low friction coefficient state.

The support device described in Patent Document 4 is formed of a porous compact with a plurality of voids in which at least one of the slide member and the counter member is formed of a composition containing aromatic polyester which consists primarily of tetrafluoroethylene resin. In the support device described in Patent Document 4, outflow of the lubricant is prevented by impregnating a polysiloxane (silicone) lubricant in the voids.

In Patent Documents 5 and 6, there is proposed a support device in which a slide member is made of a self-lubricating resin, and a sliding surface of a counter member is coated with a resin film made by chemical bonding of fluorine-containing polymer and silicone oil, thereby preventing the lubricant from flowing out.

In the support device described in Patent Document 5, the sliding surface of the slide member is made of a self-lubricating synthetic resin. On the other hand, on the sliding surface of the counter member, there is formed a deposited film of a composition solidifying material comprising epoxy resin and reactive silicone oil with an epoxy equivalent weight equal to or less than 1000 having an epoxy group in a side chain. In the composition solidifying material, reactive silicone oil forms a three-dimensional reticular structure by calcination treatment at 180° C., thereby preventing silicone oil from flowing out.

In the support device described in Patent Document 6, the sliding surface of the slide member is formed of a resin consisting primarily of tetrafluoroethylene resin, and the counter member is made of a metal plate having an overlying film on the surface thereof. The overlying film is formed singly or as a compound, from a fluorine-containing polymer having a functional group at the end, or an organosiloxane, with a film thickness thereof being about 0.01 to 5 μm.

PRIOR ART DOCUMENT

Patent Document

[Patent Document 1] Japanese Unexamined Utility Model Application, First Publication No. H01-122102

[Patent Document 2] Japanese Unexamined Patent Application, First Publication No. 2000-320611

[Patent Document 3] Japanese Unexamined Patent Application, First Publication No. 2001-132757

[Patent Document 4] Japanese Unexamined Patent Application, First Publication No. 2001-82543

[Patent Document 5] Japanese Unexamined Patent Application, First Publication No. H11-124591

[Patent Document 6] Japanese Unexamined Patent Application, First Publication No. H01-146042

DISCLOSURE OF INVENTION

Problems to be Solved by the Invention

However, in the above-mentioned prior art, there are problems as described below.

First, in the art described in Patent Documents 1 and 2, the sliding surface of the counter member needs to be smoothly polished, or a self-lubricating synthetic resin needs to be arranged on the sliding surface thereof. Specifically, in the art described in Patent Document 2, when a maximum height Rz indicating surface roughness exceeds 0.5 μm, wear characteristics of the sliding member becomes impaired, and the friction coefficient μ increases.

Moreover, in the art described in Patent Document 3, in order to sustain a decrease in the contact surface area of a slide member with a counter member due to concave machining of the slide member, a material having a compressive strength of from 50 to 100 MPa is required as the slide member. Furthermore, in the counter member, in order to ensure load bearing performance, the thickness of the synthetic resin film coated on the surface thereof needs to be reduced. Consequently, a highly accurate machining technique is required for forming the film.

Furthermore, in the art described in Patent Documents 4 to 6, a special compounding agent is required for forming a special self-lubricating resin film on the sliding surface of the counter member, or a complicated manufacturing process such as heat treatment or special manufacturing equipment is required, thereby increasing the manufacturing cost.

It is an object of the present invention to provide a slide structure that can be manufactured relatively easily and with a low cost without requiring a complicated manufacturing process or equipment, and that can maintain the low friction state reliably, a support device and a seismically isolated structure including the slide structure.

Means for Solving the Problems

The slide structure of the present invention comprises a first member and a second member provided opposite to each other, with the first member slidably provided along a surface of the second member. In the first member, a first sliding surface that slidingly contacts with the second member is made from a synthetic resin material having a predetermined Young's modulus. In the second member, a second sliding surface that slidingly contacts with the first sliding surface is made from an elastic body having a Young's modulus more than twice as large as the Young's modulus of the first sliding surface. At the same time, the second sliding surface is roughened such that a maximum height (Rz) of irregularities is 3 μm or more, and a lubricant is applied thereto.

Here, the maximum height (Rz) stands for the maximum height Rz defined by JIS B0601-2001 (corresponding to ISO 4287, Geometrical Product Specifications (GPS)—Surface texture; Profile method—Terms, definitions and surface texture parameters). It is preferable that the maximum height (Rz) of irregularities (a rough surface or roughness) of the second sliding surface is equal to or less than 70 μm.

The maximum height (Rz) indicates the sum of the maximum value of an absolute value of peak height (Zp) and the maximum value of an absolute value of valley depth (Zv) of a contour curve in a reference length (lr). Here, the reference length (lr) indicates a length in an X-axis direction of the contour curve of the rough surface. The peak height (Zp) indicates an absolute value of a height from the X axis to a peak in a peak higher than an average line, when the contour curve is cut by the X axis (average line). On the other hand, the valley depth (Zv) indicates an absolute value of a depth from the X axis to the bottom of the valley in a valley lower than the average line, when the contour curve is cut by the X axis (average line).

According to the present invention, the second sliding surface is made of an elastic body having a Young's modulus more than twice as large as the Young's modulus of the first sliding surface, and the second sliding surface is roughened such that the maximum height (Rz) of irregularities is 3 μm or more. Consequently, the first sliding surface having the Young's modulus smaller than that of the second sliding surface deforms following the irregularities on the second sliding surface, and the deformation absorbs the irregularities on the second sliding surface so that the sliding surfaces can slidingly contact with each other with low friction. Moreover, by setting the Young's modulus of the second sliding surface large, deformation of the second sliding surface is suppressed, even if the thickness of the elastic body constituting the second sliding surface is large. Consequently, the irregularities on the second sliding surface can be formed relatively easily, thereby simplifying the manufacturing process for forming the elastic body, and enabling a cost reduction with the small manufacturing equipment. The lubricant applied to the second sliding surface is trapped in small pits in the roughened surface to prevent the lubricant from flowing out, and the low friction coefficient state (for example, a state of dynamic friction coefficient μ≤0.1 or μ≤0.03) between the sliding surfaces can be maintained. It is preferable that the dynamic friction coefficient is as small as possible, and the lower limit thereof is not particularly limited. Here, the lubricant can be a gel lubricant or a liquid lubricant. Consequently, a special self-lubricating synthetic resin material need not be used for the elastic body of the second member. Hence, the slide structure of the present invention can be manufactured with a relatively low cost, with material cost being reduced.

At this time, in the slide structure of the present invention, it is desired that the first sliding surface is made from a self-lubricating synthetic resin material.

By forming the first sliding surface having a smaller area than the second sliding surface from the self-lubricating synthetic resin material, the friction coefficient between the sliding surfaces can be decreased further, while holding down the material cost.

Moreover, in the slide structure of the present invention, it is desired that the second sliding surface is made from a synthetic resin material having a thickness equal to or larger than 40 μm.

According to such a configuration, irregularities on the second sliding surface can be formed relatively easily by setting the thickness of the synthetic resin material constituting the second sliding surface to equal to or larger than 40 μm. For example, irregularities on the second sliding surface can be formed by using a simple forming method such as spraying of synthetic resin, thereby facilitating simplification of the manufacturing equipment, and cost reduction.

Moreover, the support device of the present invention includes any one of the slide structures described above, wherein the first sliding surface of the first member and the second sliding surface of the second member are respectively formed by a flat surface.

Furthermore, the support device of the present invention includes any one of the slide structures described above, wherein the first and second sliding surfaces can be formed of a curved surface such that the first sliding surface of the first member has a convex curvature, and the second sliding surface of the second member has a concave curvature.

Moreover, the support device of the present invention includes any one of the slide structures described above, wherein the first and second sliding surfaces can be formed of a curved surface such that the first sliding surface of the first member has a concave curvature, and the second sliding surface of the second member has a convex curvature.

According to such a support device, as in the slide structure described above, a support device that can bring the first sliding surface and the second sliding surface into sliding contact with each other in a low friction state, and that can prevent the lubricant from flowing out and maintain the low friction state can be realized.

At this time, in the support device of the present invention, a laminated rubber device can be serially connected with the first member or the second member.

According to such a configuration, by serially connecting the first member or the second member of the sliding support portion with the laminated rubber device, a support device having appropriate initial elastic stiffness in a sliding direction and damping performance corresponding to design conditions can be realized.

Moreover, the seismically isolated structure of the present invention is characterized in that a load from an upper structure is supported by any one of the support devices described above.

According to the seismically isolated structure, as in the support device described above, the low friction state can be maintained. That is to say, according to the seismically isolated structure of the present invention, even if the seismically isolated structure undergoes disturbance (cyclic load such as earthquake, wind, or mechanical vibrations) several times during long-time use of the structure, performance deterioration of the support device can be prevented. Moreover, maintenance labor such as replenishment of the lubricant during the period can be alleviated or omitted.

Effects of the Invention

According to the slide structure, the support device, and the seismically isolated structure including the slide structure, of the present invention, by forming the second sliding surface from an elastic body having a Young's modulus more than twice as large as that of the first sliding surface, irregularities on the second sliding surface can be formed relatively easily. Therefore, a complicated manufacturing process and equipment are not required, thereby enabling a cost reduction. Moreover, the first sliding surface deforms following the second sliding surface, and the lubricant is trapped in small pits in the roughened surface of the second sliding surface to prevent the lubricant from flowing out, thereby enabling to reliably maintain the low friction state between the sliding surfaces.

BRIEF DESCRIPTION OF THE DRAWINGS

FIG. 1 is a sectional view showing a part of a seismically isolated structure according to an embodiment of the present invention.

BEST MODE FOR CARRYING OUT THE INVENTION

Figure 2A:
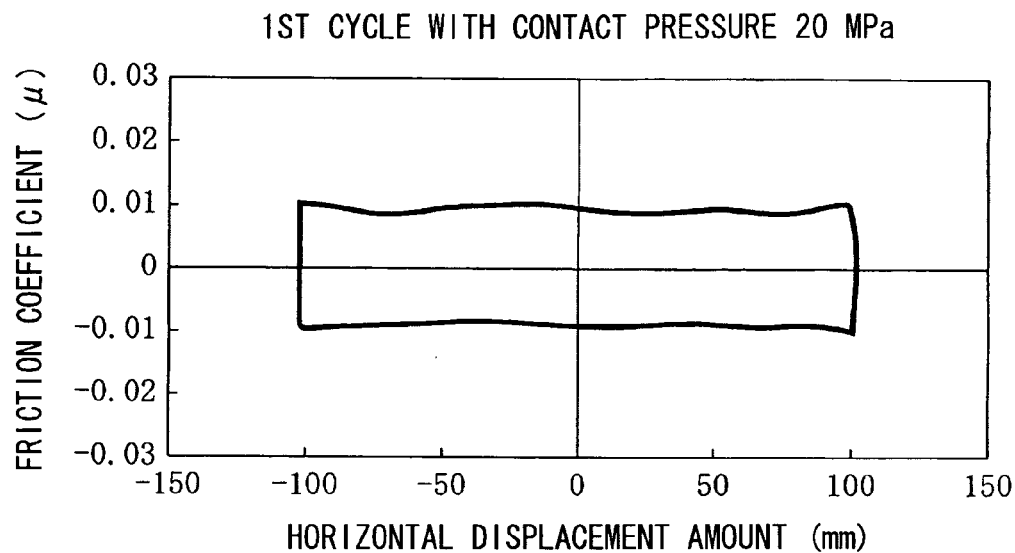
FIG. 2A is a graph of load carrying test results for a support device in a first embodiment of the present invention.

Hereunder is a description of an embodiment of the present invention, with reference to the drawings.

In FIG. 1, the seismically isolated structure of the present invention includes a seismic isolation device 1 serving as a support device, between a foundation F and an upper structure S, and a load of the upper structure S is transmitted to the foundation F via the seismic isolation device 1. Moreover, when a horizontal force such as an earthquake acts on the seismically isolated structure of the present invention, the seismic isolation device 1 deforms horizontally so that an input of the horizontal force to the upper structure S is decreased. The seismic isolation device 1 is formed by vertically and serially connecting to each other, a sliding support section 2 provided on the foundation F side and a laminated rubber support section (laminated rubber device) 3 provided on the upper structure S side.

The laminated rubber support section 3 includes upper and lower flanges 31 and 32 and a laminated rubber section 33 in which a rubber plate and an iron plate are alternately laminated between these flanges 31 and 32. The upper flange 31 is fixed to the upper structure S, and the lower flange 32 is fixed to the sliding support section 2. In the laminated rubber section 33, the iron plate restrains vertical deformation (expansion and contraction) of the rubber plate but does not restrain shear deformation of the rubber plate, so that the laminated rubber section 33 can have shear deformation in front, back, right, and left directions, while supporting the load of the upper structure S. By such shear deformation of the laminated rubber section 33, transmission of the horizontal force from the foundation F to the upper structure S hardly occurs until the sliding support section 2 starts to slide.

The sliding support section 2 includes a first member 21 (hereinafter referred to as a slide member 21) fixed to the lower flange 32 of the laminated rubber support section 3 (that is, on the upper structure S side), a second member 22 (hereinafter referred to as a counter member 22) fixed to the foundation F, and a lubricant 101 provided between the slide member 21 and the counter member 22. In the sliding support section 2 of the present invention, these slide member 21 and counter member 22 are provided vertically facing each other, and the slide member 21 slides in the front, back, right, and left directions along the upper face of the counter member 22, so that the horizontal force from the foundation F is hardly transmitted to the laminated rubber support section 3 and the upper structure S.

The slide member 21 includes a steel holding section 23 fixed to the flange 32 and a sliding body 24 made of synthetic resin held on the underside of the holding section 23. The holding section 23 is formed in a flat disk shape overall with a concave cross-section opening downward, and the sliding body 24 is fixed to the concave portion by bonding. The sliding body 24 is formed in an overall disk shape from a self-lubricating synthetic resin material such as tetrafluoroethylene resin, polyamide resin, or polyethylene resin, or a mixture thereof. A first sliding surface 25 that slidingly contacts with the counter member 22 is formed on the lower surface of the sliding body 24. The first sliding surface 25 is a surface of the slide member 21 that slidingly contacts with the counter member 22. The Young's modulus of the first sliding surface 25 is not particularly limited, but is in a range of from 400 MPa to 800 MPa.

On the other hand, the counter member 22 includes a counter member body 26 made of a steel plate embedded in and fixed to the foundation F, and a film 27 made of synthetic resin serving as an elastic body formed on the upper surface of the counter member body 26. The film 27 has a film thickness, for example, equal to or larger than 50 µm made by an epoxy or urethane thick film coating. Moreover, the surface of the film 27 constitutes a second sliding surface 28 that slidingly contacts with the first sliding surface 25 of the slide member 21. The second sliding surface 28 is a surface of the counter member 22 that slidingly contacts with the first sliding surface 25 of the slide member 21.

Figure 4:
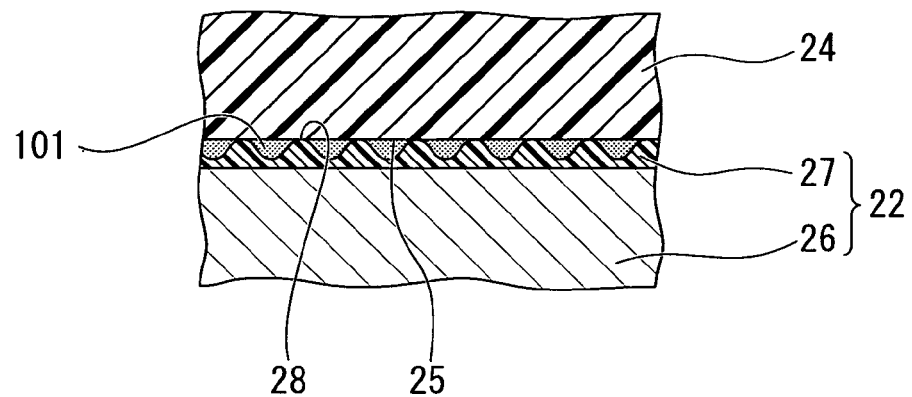
FIG. 4 is an example of an enlarged sectional view of a slide structure of the seismically isolated structure in FIG. 1.
Figure 5:
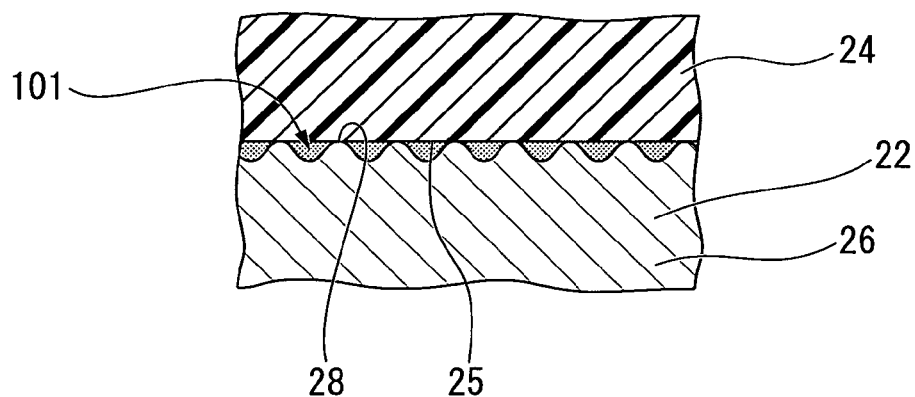
FIG. 5 is an example of the enlarged sectional view of the slide structure of the seismically isolated structure in FIG. 1.

FIG. 4 and FIG. 5 show an enlarged diagram of the first sliding surface 25 and the second sliding surface 28.

The second sliding surface 28 has a finely roughened surface such that the maximum height Rz of irregularities defined by JIS B0601-2001 (ISO 4287) is from 3 to 70 µm inclusive. More preferably, the maximum height Rz is from 3 to 40 µm inclusive. Moreover, on the second sliding surface 28, the roughened shapes are similar to each other at arbitrary places. Furthermore, the synthetic resin constituting the film 27 is made from a resin material having a Young's modulus more than twice as large as that of the synthetic resin constituting the sliding body 24. That is to say, the second sliding surface 28 of the counter member 22 has a Young's modulus more than twice as large as that of the first sliding surface 25 of the slide member 21.

As a forming method of the film 27 on the counter member 22, the film 27 having irregularities can be formed by a simple method, for example, by performing airless spray coating at normal temperature in the case of epoxy coating. Furthermore, irregularities can be formed by a relatively simple method if the film thickness of the film 27 is 50 µm or more. If the film thickness is as thick as 200 µm or 500 µm, the film 27 and irregularities can be formed more easily. Moreover, surface treatment for decreasing the friction coefficient of the film surface itself such as fluororesin coating can be applied as well to the surface of the film 27. When a film is coated by fluororesin, the thickness of the coating layer is about 10 nm to 30 nm, which does not affect the roughened surface (roughness) and the coefficient of elasticity on the second sliding surface 28 of the counter member 22.

Furthermore, as shown in FIG. 5, the counter member 22 can be formed from only a steel plate, that is, only the counter member body 26. At this time, a rough surface can be formed by etching on the surface, that is, on the second sliding surface 28 of the counter member 22. As an etching solution, ferric chloride, hydrochloric acid, or sulfuric acid can be used.

When the counter member 22 is formed from only the counter member body 26 such as a steel plate, the second sliding surface 28 of the counter member 22 may have a Young's modulus of about 300 to 400 times as large as that of the first sliding surface 25 of the slide member 21.

The lubricant 101 provided between the slide member 21 and the counter member 22 can be a gel lubricant made from grease (including additives) such as mineral or synthetic oil (silicone oil, fluorine oil, or the like), or can be a liquid lubricant made from synthetic oil (silicone oil, fluorine oil, ester oil, or the like) or mineral oil. Moreover, the lubricant can be mixed with a solid lubricant such as molybdenum disulfide. As a specific lubricant, silicone grease, fluorine grease, mineral grease, silicone oil, fluorine oil, or mineral oil are preferable.

EXAMPLES

First Experimental Example

In the sliding support section 2 described above, test specimens (Examples 1 to 4) in which conditions of the slide member 21, the counter member 22, and the lubricant were set as shown in Table 1 described below were produced, and test specimens (Comparative Examples 1 and 2) in which conditions of the surface of the counter member 22 were different were produced, and constant-velocity cyclic loading tests were carried out.

Here, in each test specimen in Examples 1 to 4 and Comparative Examples 1 and 2, a slide member 21 was made of tetrafluoroethylene resin with a filler, and included a sliding body 24 formed in a disk shape with a diameter φ being 100 mm and a thickness being 4 mm. The Young's modulus of the sliding body 24 was 600 MPa. Moreover, in the test specimens in Examples 1 to 4, a counter member 22 included a film 27 obtained by spray coating an epoxy paint on the surface of a counter member body 26 made from a steel plate, and the thickness of the coating film of the film 27 was 250 µm, and the Young's modulus of the film 27 was 5 GPa. When the maximum height Rz of irregularities (JIS B0601-2001/ISO 4287) on the surface of the film 27 (the second sliding surface 28) was measured, Rz was, respectively, 4.86 µm in the case of a reference length being 0.8 mm, 9.7 µm in the case of the reference length being 2.5 mm, and 30.8 µm in the case of the reference length being 8 mm.

TABLE 1

|  | Example 1 | Example 2 | Example 3 | Example 4 | Comparative Example 1 | Comparative Example 2 |
| --- | --- | --- | --- | --- | --- | --- |
| Surface of counter member | Epoxy coating | | | | SUS polished | tetrafluoroethylene printed film 30 µm |
| Lubricant | Silicone grease (consistency 260) | | | Silicone oil 1000 cSt | Silicone grease (consistency 260) | Silicone grease (consistency 260) |

TABLE 1-continued

|  | Example 1 | Example 2 | Example 3 | Example 4 | Comparative Example 1 | Comparative Example 2 |
|---|---|---|---|---|---|---|
| Maximum height Rz |  | 4.86 (Reference length lr = 0.8 mm) 9.7 (Reference length lr = 2.5 mm) 30.8 (Reference length lr = 8 mm) | | | 1.1 | 24 |
| Contact pressure (MPa) | 10 | 20 | 40 | 20 | 20 | 20 |
| Friction coefficient | 0.010 | 0.010 | 0.007 | 0.011 | 0.009 | 0.013 |

As shown in Table 1, the parameters on the load carrying test in respective Examples 1 to 4 are as follows.

In Example 1, silicone grease having a consistency (corresponding to JIS K2220/ISO 2137, ISO 2176, and ISO 11009) of about 260 was used as the lubricant, and a contact pressure between the slide member 21 and the counter member 22 was set to 10 MPa.

In Example 2, silicone grease having a consistency (corresponding to JIS K2220/ISO 2137, ISO 2176, and ISO 11009) of about 260 was used as the lubricant, and a contact pressure between the slide member 21 and the counter member 22 was set to 20 MPa.

In Example 3, silicone grease having a consistency (corresponding to JIS K2220/ISO 2137, ISO 2176, and ISO 11009) of about 260 was used as the lubricant, and a contact pressure between the Slide member 21 and the counter member 22 was set to 40 MPa.

In Example 4, silicone oil having a kinetic viscosity of 1000 cSt (25° C.) was used as the lubricant, and a contact pressure between the slide member 21 and the counter member 22 was set to 20 MPa.

The consistency stands for an ingress depth of a circular cone fitted to a consistency meter, which is dropped into a test specimen (lubricant) filled in a pot, at 25° C. after 5 seconds, and the unit thereof is mm.

The kinetic viscosity stands for a magnitude of resistance when liquid flows under gravity. In the present invention, the kinetic viscosity is a value obtained by dividing the viscosity (cP) of the liquid at 25° C. by the density (g/mm$^3$), and the unit thereof is cSt (or mm$^2$/s).

On the other hand, in Comparative Example 1, the surface of a counter member was SUS polished, and the maximum height Rz of irregularities on the surface was 1.1 µm. Moreover, in Comparative Example 1, silicone grease having a consistency (corresponding to JIS K2220/ISO 2137, ISO 2176, and ISO 11009) of about 260 was used as the lubricant, and a contact pressure between the slide member 21 and the counter member 22 was set to 20 MPa.

Furthermore, in Comparative Example 2, a tetrafluoroethylene printed film having a film thickness of 30 µm was formed on the surface of a counter member, and the maximum height Rz of irregularities on the surface was 24 µm. Moreover, in Comparative Example 2, silicone grease having a consistency (corresponding to JIS K2220/ISO 2137, ISO 2176, and ISO 11009) of about 260 was used as the lubricant, and a contact pressure between the slide member 21 and the counter member 22 was set to 20 MPa.

In the respective test specimens described above, the constant-velocity cyclic loading tests were performed under conditions in which the test speed was 10 mm/s and the amplitude was ±100 mm.

The constant-velocity cyclic loading test is a test in which after a load is applied such that the contact pressure between the slide member 21 and the counter member 22 becomes each contact pressure value shown in Table 1, alternate loading and unloading is performed so that the speed becomes 10 mm/s, the amplitude becomes ±100 mm, and the time-displacement relation forms cone-shaped waves with a predetermined number of cycles.

As a result of performing the load carrying tests under the respective conditions described above, the friction coefficient between the slide member 21 and the counter member 22 were from 0.007 to 0.011 in Examples 1 to 4, 0.009 in Comparative Example 1, and 0.013 in Comparative Example 2. That is to say, it was confirmed that in any of the Examples 1 to 4 of the present invention, low friction coefficients as low as those of Comparative Examples 1 and 2 could be obtained.

Figure 2B:
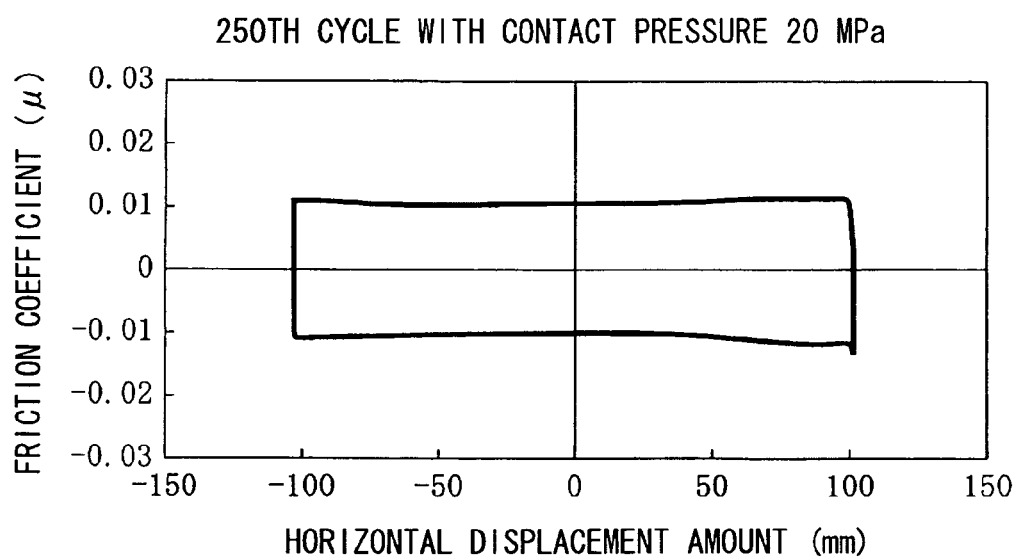
FIG. 2B is a graph of load carrying test results for the support device in the first embodiment of the present invention.

Moreover, the relation between the amount of horizontal displacement and the friction coefficient in Example 2 is shown in FIG. 2A and FIG. 2B. In a historical loop of the first cycle shown in FIG. 2A and a historical loop of the 250th cycle shown in FIG. 2B, no difference is seen in the relation between the amount of horizontal displacement and the friction coefficient. That is to say, it was confirmed that the stable low friction state could be maintained until the 250th cycle of alternate repetitions, without causing outflow of the lubricant.

TABLE 2

|  | Example 2 | | |
|---|---|---|---|
| Reference length lr (mm) | 0.8 | 2.5 | 8 |
| Maximum height Rz (µm) | 4.86 | 9.7 | 30.8 |
| Arithmetic average height Ra (µm) | 0.8 | 1.7 | 6.3 |

The state of irregularities (rough surface or roughness) on the surface of the film 27 of the counter member 22 in Example 2 is shown in Table 2. On the surface of the film 27, the irregularity shape is similar in arbitrary places thereof. That is to say, irregularities (roughness) are provided over the whole surface, and an arithmetic average height (Rz) in a certain reference length (lr) shown in Table 2 is obtained. Particularly, as shown in Table 2, on a surface having irregularities with the maximum height (Rz) being 3 µM or higher, irregularities (roughness) that can hold the lubricant sufficiently can be provided over the whole surface.

Here, the arithmetic average (Ra) height stands for an average of absolute values of the height of a contour curved line (longitudinal coordinate value (Zx)) in the reference length (lr).

Second Experimental Example

In a Second Experimental Example, a disk-shaped sliding body 24 with a Young's modulus of 600 MPa, and made of tetrafluoroethylene resin with a filler and having a diameter φ of 600 mm and a thickness of 4 mm was used as the sliding body 24 of the slide member 21 as in the First Experimental Example. Moreover, as the counter member 22, one having a film 27 obtained by spray coating an epoxy paint on the surface of a steel plate was used as in the First Experimental Example, and the thickness of the coating film of the film 27 was 250 and the Young's modulus of the film 27 was 5 GPa. Moreover, when the maximum height Rz of irregularities (JIS B0601-2001/ISO 4287) on the surface of the film 27 (the second sliding surface 28) was measured, Rz was, respectively, 10.2 μm in the case of a reference length being 0.8 mm, 18.5 μm in the case of the reference length being 2.5 mm, and 39.2 μm in the case of the reference length being 8 mm. Moreover, silicone grease having a consistency (corresponding to JIS K2220/ISO 2137, ISO 2176, and ISO 11009) of about 260 was used as the lubricant. Furthermore, the contact pressure between the slide member 21 and the counter member 22 in respective Examples 5 to 7 was set to three values, namely; 5 MPa, 20 MPa, and 40 MPa, respectively. Furthermore, the load carrying test was performed by means of sinusoidal cyclic loading and unloading and under conditions in which the test maximum speed was 400 mm/s and the amplitude was ±200 mm.

The load carrying test by means of sinusoidal cyclic loading and unloading is a test in which after a load is applied such that the contact pressure between the slide member 21 and the counter member 22 becomes each contact pressure value shown in Table 2, alternate loading and unloading is performed so that the maximum speed becomes 400 mm/s and the time-displacement relation forms sinusoidal waves of a predetermined number of cycles.

TABLE 3

| | Example 5 | Example 6 | Example 7 |
|---|---|---|---|
| Surface of counter member | Epoxy coating | | |
| Lubricant | Silicone grease (consistency 260) | | |
| Maximum height Rz | 10.2 (Reference length lr = 0.8 mm) 18.5 (Reference length lr = 2.5 mm) 39.2 (Reference length lr = 8 mm) | | |
| Contact pressure (MPa) | 5 | 20 | 40 |
| Friction coefficient | 0.015 | 0.007 | 0.005 |

As a result of performing the load carrying tests under the respective conditions described above, the friction coefficients between the slide member 21 and the counter member 22 were from 0.005 to 0.015 in Examples 5 to 7, and it was confirmed that low friction coefficients as low as those of the Examples in the First Experimental Example could be obtained.

Figure 3A:
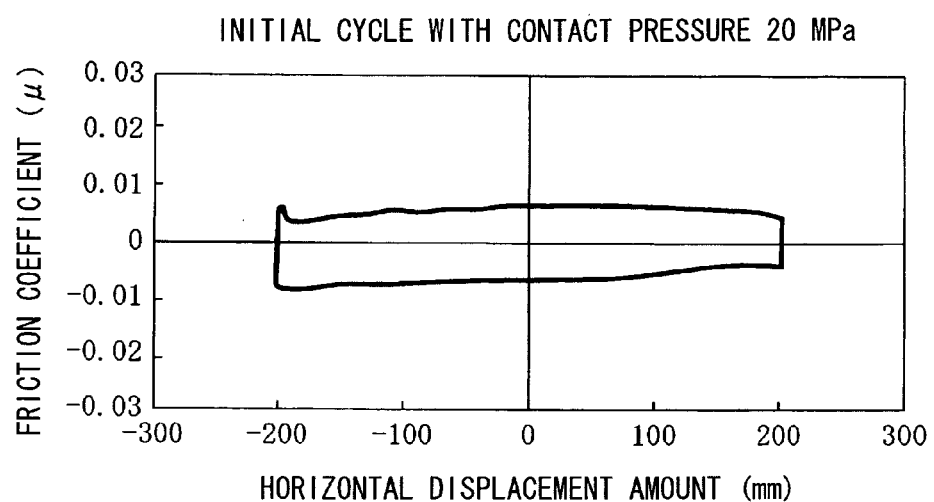
FIG. 3A is a graph of load carrying test results for a support device in a second embodiment of the present invention.
Figure 3B:
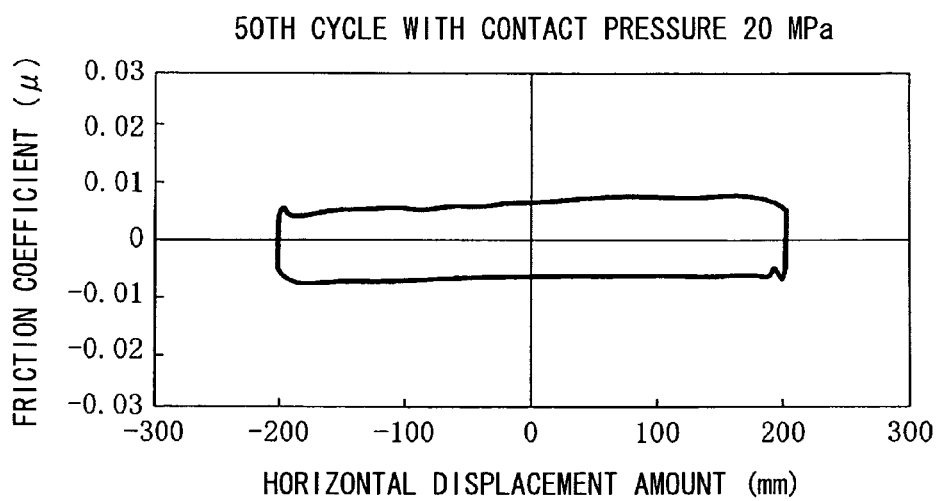
FIG. 3B is a graph of load carrying test results for the support device in the second embodiment of the present invention.

Moreover, the relation between the amount of horizontal displacement and the friction coefficient in the case of the contact pressure being 20 MPa (Example 6) is shown in FIG. 3A and FIG. 3B. In the historical loop of the first cycle shown in FIG. 3A and the historical loop of the 50th cycle shown in FIG. 3B, no difference is seen in the relation between the amount of horizontal displacement and the friction coefficient. That is to say, it was confirmed that even in the case of high speed tests, the stable low friction state could be maintained until the 50th cycle of alternate repetitions, without causing outflow of the lubricant.

TABLE 4

| | Example 6 | | |
|---|---|---|---|
| Reference length lr (mm) | 0.8 | 2.5 | 8 |
| Maximum height Rz (μm) | 10.2 | 18.5 | 39.2 |
| Arithmetic average height Ra (μm) | 1.9 | 3.0 | 6.9 |

The state of irregularities (rough surface or roughness) on the surface of the film 27 of the counter member 22 in Example 6 is shown in Table 4. On the surface of the film 27, the irregularity shape is similar in arbitrary places thereof. That is to say, irregularities (roughness) are provided over the whole surface, and an arithmetic average height (Rz) in a certain reference length (lr) shown in Table 4 is obtained. Particularly, as shown in Table 4, on a surface having irregularities with the maximum height (Rz) being 3 μm or higher, irregularities (roughness) that can hold the lubricant sufficiently can be provided over the whole surface.

As described above, in the present invention, the first sliding surface 25 of the slide member 21 is formed of the sliding body 24 made of synthetic resin, and the film 27 made of synthetic resin and having a Young's modulus more than twice as large as that of the first sliding surface 25 is formed on the second sliding surface 28 of the counter member 22. At the same time, in the present invention, fine irregularities having a maximum height Rz of 3 μm or higher are formed on the surface of the film 27. According to the above configuration of the present invention, the lubricant is trapped in small pits of the irregularities to prevent the lubricant from flowing out, and a stable low friction state such that the dynamic friction coefficient μ is equal to or lower than 0.03 can be maintained.

The present invention is not limited to the above-described embodiments, and includes other configurations that can achieve the object of the present invention, and also modified examples described below.

For example, there can be mentioned a case in which the sliding body 24 has a shape other than the disk shape such as an approximately rectangular shape, a case in which the sliding body 24 is directly fixed to a tabular holding section 23 which does not include small pits by bonding, or a case in which the sliding body 24 is fixed to a holding section 23 having small pits open downward by a method other than bonding, for example, by mechanical joining such as fitting, or by welding.

Moreover, for example, in the above-described embodiments, the counter member body 26 is made of steel, however, metal other than steel or resins can be used.

Figure 6:
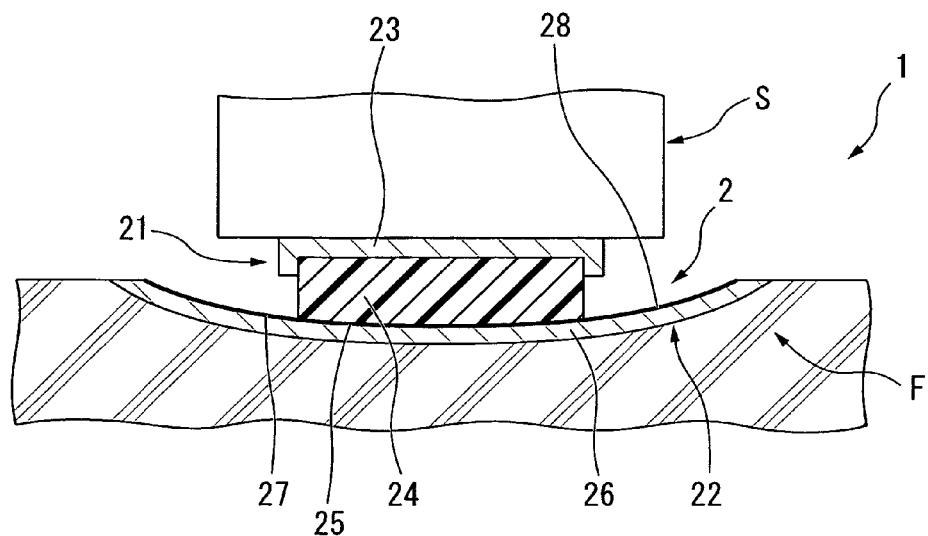
FIG. 6 is a sectional view showing a part of the seismically isolated structure of the present invention.

Furthermore, for example, in the embodiment shown in FIG. 1 and in the seismic isolation device 1 shown in FIG. 6, the counter member body 26 is embedded in the surface of the foundation F. However, a tabular receiving member made of steel or the like can be installed on the foundation F or on the surface, and the counter member body 26 can be fixed on an upper surface of the receiving member by a method such as bolting or welding. Alternatively, as shown in the seismic isolation device 1 shown in FIG. 7, the counter member body 26 can be directly installed on the upper surface of the foundation F and fixed thereto by using bolts or the like.

Furthermore, in the above-described embodiments, the slide member 21 is provided on the upper side, which is the upper structure S side, and the counter member 22 is provided on the lower side, which is the foundation F side. However, the present invention is not limited thereto, and the slide member 21 can be provided on the lower side and the counter member 22 can be provided on the upper side, so as to face each other.

Figure 7:
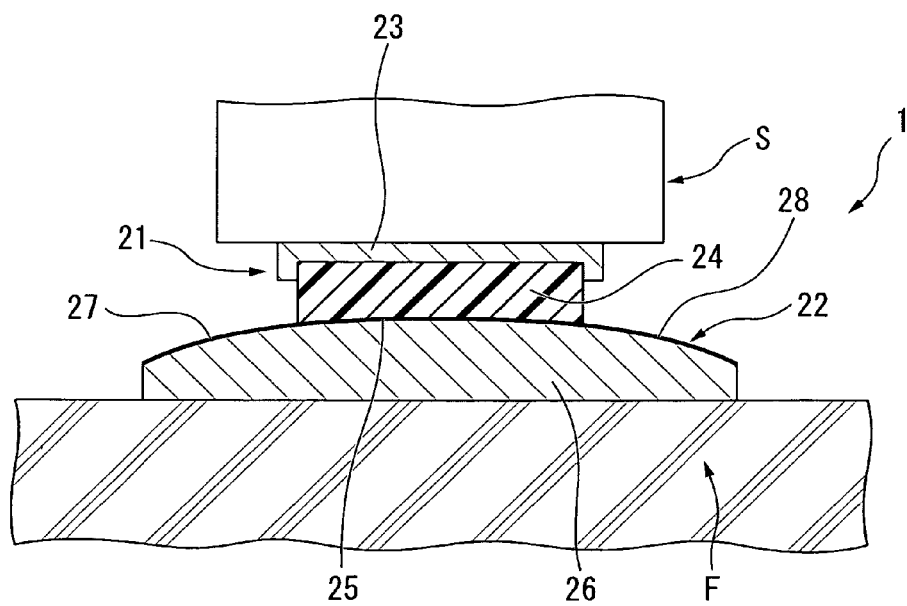
FIG. 7 is a sectional view showing a part of the seismically isolated structure of the present invention.

Moreover, in the above-described embodiments, the seismic isolation device 1 in which the laminated rubber support section 3 is serially connected to the upper part of the slide member 21 is explained. However, as the seismic isolation device, the laminated rubber support section 3 can be serially arranged on the underneath of the counter member body 26. Moreover, the laminated rubber support section 3 can be omitted. That is to say, as shown in FIGS. 6 and 7, the sliding support section 2 can be directly connected to the upper structure S, and the foundation F, the sliding support section 2, and the foundation F can be vertically connected in series.

Moreover, in the above-described embodiments, a sliding section 2 where the first sliding surface 25 of the slide member 21 and the second sliding surface 28 of the counter member 22 are respectively formed of a flat surface is explained. However, the shape of the surface is not particularly specified.

For example, in the seismic isolation device 1 of the present invention, as shown in FIG. 6, the first sliding surface 25 of the slide member 21 can be formed of a curved surface having a convex curvature, and the second sliding surface 28 of the counter member 22 can be formed of a curved surface having a concave curvature. Moreover, for example, in the seismic isolation device 1 of the present invention, as shown in FIG. 7, the first sliding surface 25 of the slide member 21 can be formed of a curved surface having a concave curvature, and the second sliding surface 28 of the counter member 22 can be formed of a curved surface having a convex curvature.

Furthermore, the object to be supported by the support device of the present invention is not limited to the seismically isolated structure such as buildings, and can be a civil engineering structure, a workpiece, or a machine foundation, and is not particularly limited so long as a reduction of vibration inputs by the support device can be expected.

Moreover, the arrangement direction of the present device is not limited to horizontal, as long as the sliding direction is approximately parallel to the direction of vibration to be reduced. That is to say, for example, there can be exemplified a case in which the present device is used for removing vertical vibration of mechanical vibrations.

The best configuration and method for carrying out the present invention are disclosed above, however, the present invention is not limited thereto. That is to say, although the present invention is particularly illustrated and explained primarily in relation to specific embodiments, the present invention can be variously modified with respect to the embodiments described above by a person skilled in the art, in the shape, material, number, and other detailed configurations, without departing from the technical concept and object of the present invention.

Consequently, description limited to the shape, material, and the like described above is for illustrative purposes for facilitating understanding of the present invention, and does not limit the present invention. Therefore, description by names of members in which a part of or all of the limitations such as the shape and material thereof are removed, is also included in the present invention.

DESCRIPTION OF REFERENCE SYMBOLS

1 Seismic isolation device (support device)
2 Sliding support section
3 Laminated rubber support section (laminated rubber device)
21 Slide member (first member)
22 Counter member (second member)
25 First sliding surface
27 Film (elastic body)
F Foundation
S Upper structure

The invention claimed is:

1. A slide structure comprising a first member and a second member provided opposite to each other, wherein
the slide structure is provided between a foundation and an upper structure,
the second member is fixed to the foundation,
the first member is fixed to a laminated rubber support section which is provided on the upper structure,
the first member is slidably provided along a surface of the second member,
the first member includes a holding section fixed to the laminated rubber support section and a sliding body held on an underside of the holding section,
the holding section is formed with a concave cross-section opening downward, and the sliding body is fixed to the concave portion,
in said first member, a first sliding surface that slidingly contacts with said second member is formed on a lower surface of the sliding body and is made from a synthetic resin material having a predetermined Young's modulus,
in said second member, a second sliding surface that slidingly contacts with said first sliding surface is made from an elastic body having a Young's modulus more than twice as large as the Young's modulus of said first sliding surface, and is formed with irregularities with a maximum height (Rz) of 3 μm or more and equal to or less than 70 μm, and a lubricant is applied to the second sliding surface, such that the lubricant fills the irregularities.

2. A slide structure according to claim 1, wherein said first sliding surface is made from a self-lubricating synthetic resin material.

3. A slide structure according to claim 1, wherein said second sliding surface is made from a synthetic resin material having a thickness equal to or larger than 40 μm and equal to or less than 70 μm.

4. A support device comprising a slide structure according to claim 1, wherein the first sliding surface of said first member and the second sliding surface of said second member are respectively formed by a flat surface.

5. A support device comprising a slide structure according to claim 1, wherein the first and second sliding surfaces are formed of a curved surface such that the first sliding surface of said first member has a convex curvature, and the second sliding surface of said second member has a concave curvature.

6. A support device comprising a slide structure according to claim 1, wherein the first and second sliding surfaces are formed of a curved surface such that the first sliding surface of said first member has a concave curvature, and the second sliding surface of said second member has a convex curvature.

7. A support device according to claim 4, wherein the laminated rubber support section is serially connected with said first member.

8. A seismically isolated structure wherein a load from the upper structure is supported by the support device according to claim 4.

9. A support device according to claim 5, wherein the laminated rubber support section is serially connected with said first member.

10. A support device according to claim 6, wherein the laminated rubber device support section is serially connected with said first member.

11. A seismically isolated structure wherein a load from the upper structure is supported by the support device according to claim 5.

12. A seismically isolated structure wherein a load from the upper structure is supported by the support device according to claim 6.

13. A slide structure according to claim 1, wherein the Young's modulus of said first sliding surface is in a range of from 400 MPa to 800 MPa.

* * * * *

UNITED STATES PATENT AND TRADEMARK OFFICE
CERTIFICATE OF CORRECTION

PATENT NO. : 8,973,887 B2  
APPLICATION NO. : 13/138930  
DATED : March 10, 2015  
INVENTOR(S) : Yasuhiro Nakata Page 1 of 1

It is certified that error appears in the above-identified patent and that said Letters Patent is hereby corrected as shown below:

In the specification

Column 10, line 53, change "being 3 μM or higher" to -- being 3 μm or higher --;

Column 11, line 5, change "was 250 and the Young's modulus" to -- was 250 μm, and the Young's modulus --; and In the claims Column 14, line 60, change "laminated rubber device support" to -- laminated rubber support --.

Signed and Sealed this  
Twenty-third Day of February, 2016

Michelle K. Lee  
*Director of the United States Patent and Trademark Office*